UNITED STATES PATENT OFFICE.

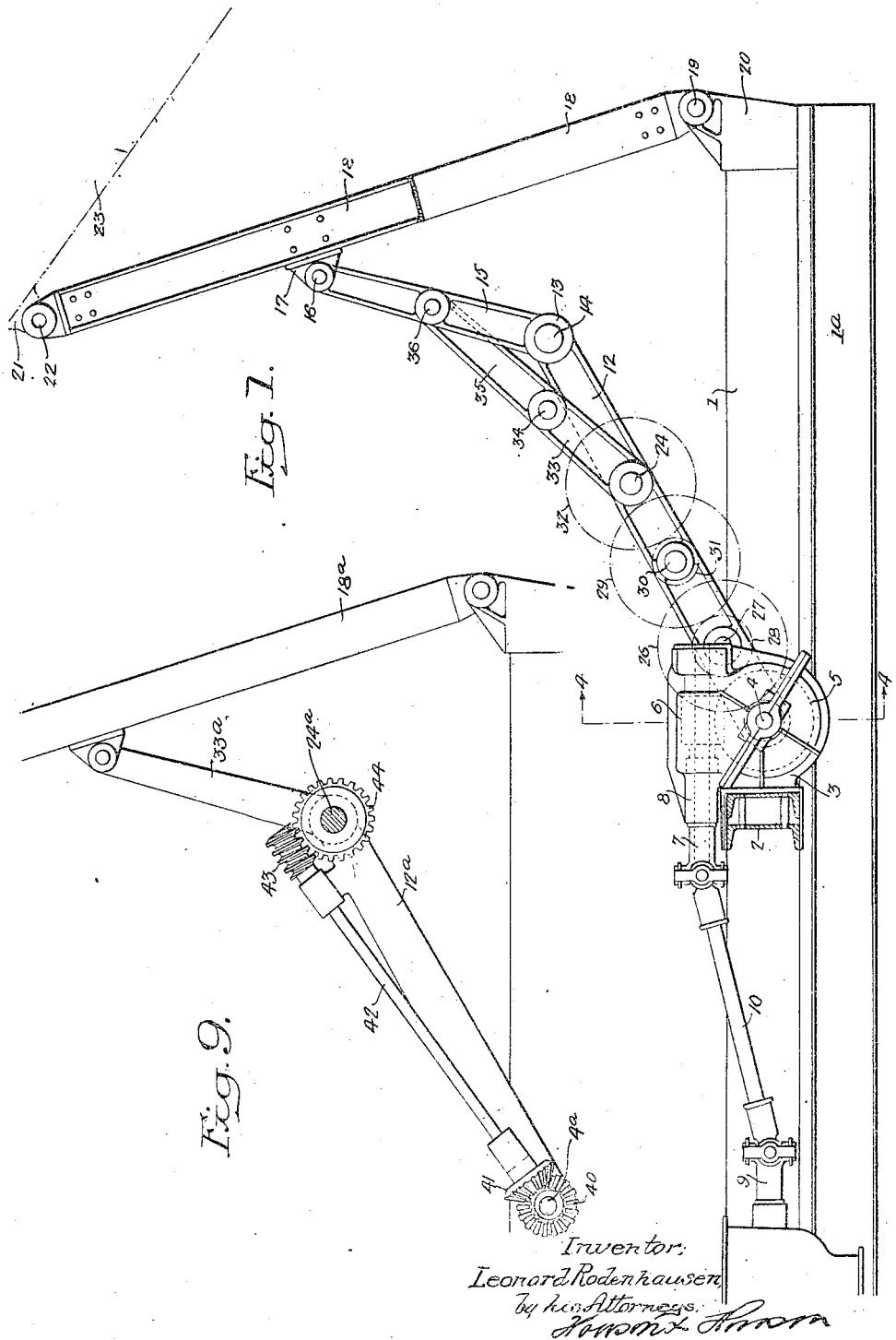

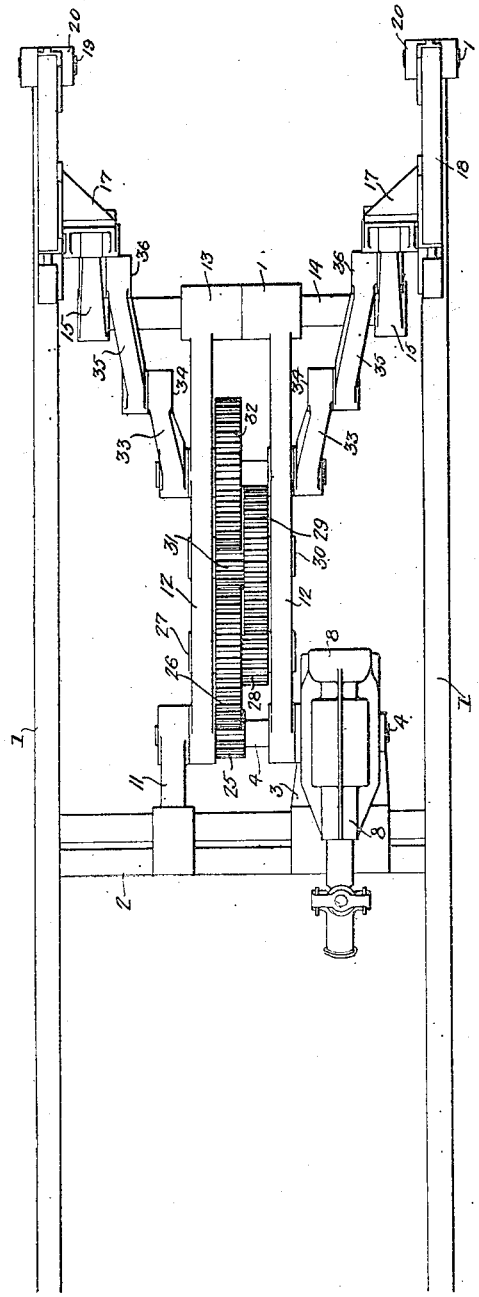

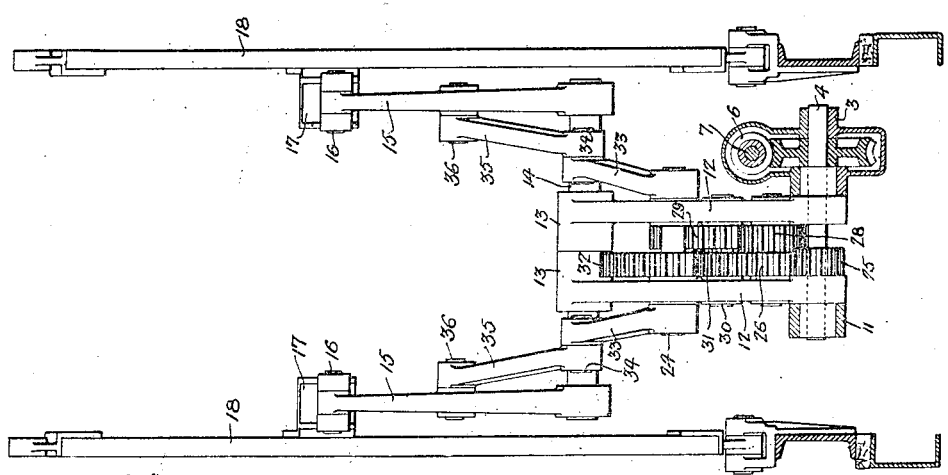

LEONARD RODENHAUSEN, OF PHILADELPHIA, PENNSYLVANIA.

LEVER MECHANISM.

1,284,779.

Specification of Letters Patent.   Patented Nov. 12, 1918.

Application filed May 4, 1918.   Serial No. 232,495.

*To all whom it may concern:*

Be it known that I, LEONARD RODENHAUSEN, a citizen of the United States, residing in Philadelphia, Pennsylvania, have invented certain Improvements in Lever Mechanisms, of which the following is a specification.

One object of my invention is to improve the construction of lever mechanisms so that the mechanism will have great power, and a further object of the invention is to carry the operating shaft by a lever and to drive it from a shaft at the fulcrum of said lever, and to arrange the parts so that they will occupy little space when closed.

The invention is particularly adapted for use in connection with dumping wagons, but it will be understood that it can be used in elevating gun mountings, opening and closing doors, &c.

In the accompanying drawings:—

Figure 1, is a side elevation of my improved lever mechanism, showing it in the raised position and located on the frame of a coal wagon to illustrate my invention;

Fig. 2, is a view, similar to Fig. 1, showing the mechanism in its lowest position, when the body of the wagon is resting on the sills;

Fig. 3, is a sectional plan view of the mechanism when in the raised position;

Fig. 4, is a transverse sectional view on the line 4—4, Fig. 1, illustrating the mechanism in the raised position;

Figs. 5, 6, 7 and 8, are views, in diagram, illustrating the mechanism in different positions; and Fig. 9, is a view of a modification.

In the present instance, 1, 1 are the main sills of a wagon body, connected by transverse channel beams 2, and secured to the channel beams is a bearing 3 in which is mounted a shaft 4. On this shaft is a worm wheel 5, in the present instance, which meshes with a worm 6 on a longitudinal shaft 7 adapted to bearings 8 in the projection of the main bearing 3. This worm shaft is connected to a driving shaft 9 through a shaft 10 connected to the shafts 9 and 7 by universal joints of any ordinary type, so that when power is applied to the driving shaft 9 it is transmitted through the shaft 10 to the worm shaft 7 and from the worm shaft to the main transverse shaft 4. Two arms 12 have trunnions mounted in the bearings 3 and 11. These arms are spaced apart and have bearings 13 at their outer ends which are extended so as to abut one against the other and thus separate the arms 12. The shaft 4 extends through the trunnions, as shown in Fig. 4. Mounted in the bearings is a pivot pin 14, which is of considerable length and is attached to the links 15, which are located near the sides of the wagon body and each of these links is connected by a pivot 16 to a bearing 17 on a lever 18 pivoted at 19 to a bearing 20, which is secured to the rear end of the main sill 1 of a wagon, in the present instance. This lever 18 may be rigidly connected throughout its length to the body of a wagon, or its outer end may be connected to a bearing 21 by a pivot pin 22 on the wagon body 23, shown by dotted lines, Fig. 1. The angle at which the wagon body can be tilted on the pivots 22 is controlled by other mechanism on the wagon and forms no part of the present invention.

Mounted on the levers 12 is a driven shaft 24, which is driven by the shaft 4 through any suitable mechanism for imparting a positive movement to the shaft 24. In the present instance, I have shown a train of gears. On the shaft 4 is a pinion 25, which meshes with a gear wheel 26 secured to the shaft 27; and also secured to the shaft 27 is a pinion 28 which meshes with a gear wheel 29 secured to a shaft 30 having its bearings in the levers 12, and also secured to the shaft 30 is a pinion 31 which meshes with a gear wheel 32 secured to the shaft 24. This arrangement gives one method of reducing the speed and increasing the power, and it will be understood that the train of gears may be varied according to circumstances. On each end of the shaft 24 is an arm 33. Each arm is pivotally connected at 34 to a link 35, which is connected by pins 36 to the levers 15. This mechanism is a power mechanism for raising the lever 18 from the horizontal position to any angle desired within a given limit. When it is desired to raise the lever 18 from the position illustrated in Fig. 2 to that illustrated in Fig. 1, the power shaft 9 is turned and this shaft turns the shaft 4 through worm and worm wheel, and the shaft turns shaft 24 through the train of gears described above so as to move the arm 33 in the direction of its arrow and this movement turns the link 15 on its pivot 14 and as this link is connected at 16 to the lever 18 which is pivoted at 19 to the sill of the wagon the lever 18 will be turned on its pivot to the position illustrated in Fig. 1, while the levers 12, which are mounted on the shaft 4 will be lifted to the position illustrated in said Fig. 1.

Referring to the diagrams, Figs. 5 to 8 inclusive, the shaft 24 will move continuously in one direction, both to raise and lower the lever 18. In Fig. 5, is shown the first position in lowering the lever from the position shown in Fig. 1. Fig. 6 shows the position of the mechanism as it nears its lowest position, which is represented in Fig. 2. Fig. 7 illustrates the shaft 24 and its arms 33 continuing the movement. Fig. 8 shows the lever in its partially raised position, while Fig. 1 illustrates the lever raised to its full height.

Thus it will be seen that I am enabled to raise and lower the lever 18 and the mechanism connected to it by a continuous movement of the operating mechanism, obviating the necessity of reversing the mechanism either to raise or lower the lever 18. This is especially useful in auto wagon trucks, in which the elevating mechanism is geared to the driving mechanism of the truck.

By the above construction, a comparatively small motor can exert considerable power to lift the load supported by the lever and when the lever is in its raised position, the arms 33 and links 35 act to brace the other elements of the lever mechanism and when the wagon body is lowered the several arms, levers and links are located in a narrow space and do not extend below the sill of the wagon.

This is important, particularly in wagon construction and especially those mounted on an automobile chassis, which is clearly indicated in 1ª in the drawings, so that a wagon body equipped with my improved lever mechanism can be mounted on any suitable chassis without changing the design either of the wagon body or the chassis.

As previously mentioned, while the invention is particularly adapted for use in connection with wagon bodies for transporting and delivering coal, sand, lime, and other granular materials, a wagon equipped with my improved lever mechanism can be used for delivering material such as asphalt, which requires a considerable angle to allow the material to flow. The invention can also be used as a gun mounting, particularly guns that have to be elevated at a high angle. The device can be mounted on a swiveled base and the proportions of the levers will depend upon the weight of the gun. The lever mechanism can also be used in connection with other machines and apparatus where a power driven lever is required.

By constructing the lever mechanism as clearly illustrated in Figs. 3 and 4 of the drawings, so that the main levers 12 are located near the center of the wagon, the connections with the side levers 18 are such that they brace the wagon body when in the elevated position, making a very substantial mechanism, especially applicable for use in connection with dumping wagons.

In some instances, as shown in Fig. 9, the lever 12ª carrying the driven shaft 24ª may be connected by the arm 33ª directly to the pivoted lever 18ª carrying the body of the wagon, or other body to be elevated, so that on turning the driven shaft in one direction the lever 18ª will be lowered, and on reversing the movement it will be elevated. In this instance, the driven shaft is turned continuously in one direction, as illustrated in said Fig. 9, in which I have also shown the driven shaft 24ª driven from the driving shaft 4ª through a longitudinal shaft and worm gearing instead of spur gearing.

On the driving shaft 4ª is a bevel gear wheel 40 which meshes with a wheel 41 on the longitudinal shaft 42 and on the opposite end of this shaft is a worm 43 which meshes with a worm wheel 44 on the driven shaft 24ª and instead of this gearing the train of gears illustrated in Fig. 1, or a chain, may be used between the driving and driven shafts. In fact, any mechanism may be used for imparting movement to the driven shaft from the driving shaft.

I claim:

1. The combination in a lever mechanism, of a driving shaft; a lever pivoted to the same center as the driving shaft; a driven shaft mounted on the lever; gearing between the driving and the driven shaft; an arm on the driven shaft; a link connected to the lever beyond the bearing of the driving shaft and a second lever pivoted at a fixed point in reference to the driving shaft and to which the link is connected some distance from the pivot; and a second link connecting the arm with the first link intermediate of its connection with the first and second levers.

2. The combination of a driving shaft adapted to fixed bearings; means for driving said shaft; two levers spaced apart; a driven shaft mounted on said levers; a train of gears between the driving and the driven shaft, said gears being carried by the levers, the levers extending beyond the driven shaft; a second lever pivoted in fixed relation to the driving shaft; links connecting the first pair of levers with the second pair of levers some distance from the pivot of the second pair of levers; arms on the driven shaft; a second pair of links connecting the arms with the first pair of links intermediate of the pivot connections of the said first pair of links so that as motion is imparted to the driven shaft, the arms will be turned and the first mentioned levers will be raised and motion will be imparted through the links to the second pair of levers carrying the load.

3. The combination of a frame; bearings on the frame; a driving shaft mounted in bearings; a worm wheel on the driving shaft; a power shaft having a worm meshing with the worm wheel; two levers mounted on the driving shaft, said levers being spaced apart; a driven shaft mounted on the links some distance from the driving shaft; a train of gearing in the space between the levers and carried by the levers through which the driven shaft is driven from the driving shaft; an arm on each end of the driven shaft beyond the levers; a transverse pivot shaft carried by the end of the levers; links mounted on the said shaft; and a second set of levers pivoted at a fixed point in relation to the driving shaft and arranged to carry the load, the links being connected to the levers some distance from their pivots; and a second set of links connecting the arms with the first mentioned links intermediate of their pivot connections.

4. The combination of a frame; a shaft adapted to fixed bearings in the frame; a lever mounted on the shaft; a second lever pivoted to fixed bearings in the frame and extending in the opposite direction to the first lever; said second lever carrying the load; a link connecting the outer end of the first lever with the second lever; a driven shaft mounted on the first lever; an arm on said shaft; a second link connecting the arm with the first link intermediate of the connections of the first link with the two levers so that when the driven shaft is turned in one direction the two levers will be raised, and when the shaft is turned in the opposite direction the two levers will be lowered and both levers will assume a horizontal position.

5. The combination in lever mechanism, of a pivoted device to be elevated, a driving shaft; a lever pivoted on the same center as the driving shaft; a driven shaft mounted on the lever; gearing carried by the lever between the driving and the driven shafts; an arm rigidly secured to the driven shaft; a link connected to the lever beyond the bearing of the driving shaft; a link connecting the first mentioned link with the arm on the driven shaft, the first mentioned lever being connected to the pivoted device to be elevated, the parts being so proportioned that the device can be raised and lowered on a continuous movement in one operation of the driven shaft.

6. The combination of lever mechanism for elevating a wagon body; a frame mounted on the chassis of an auto truck, a lever pivoted to the end of the frame and arranged to support the body of a wagon; a driving shaft; levers pivotally mounted on said shaft; a driven shaft carried by said levers; a train of gears between the driving shaft and the driven shaft; worm and worm gearing between the power mechanism of the truck and the driving shaft; links connecting the second levers with the first mentioned levers; arms on the driven shaft; and links connecting the arms with the first mentioned links, the parts being so arranged that when the mechanism is in its lowest position the gear will not extend below the upper frame of the chassis.

7. The combination in lever mechanism, of a power shaft; a lever pivoted thereon; a driven shaft carried by the lever; means for driving the driven shaft from the power shaft; an arm on the driven shaft; and mechanism connected to the arm and to the lever which will be raised and lowered on rotating the driven shaft.

8. The combination in lever mechanism, of a power shaft; a lever pivoted thereon; a driven shaft carried by the lever; means for driving the driven shaft from the power shaft; an arm on the driven shaft; mechanism connected to the arm and to the lever which will be raised and lowered on rotating the driven shaft; and worm gearing for driving the power shaft which will lock the lever mechanism in any position to which it is adjusted.

9. The combination in lever mechanism, of a base; means to be moved pivoted to the base; a driving shaft, a lever pivoted at the same center as said shaft; a driven shaft carried by said lever; means for driving the driven shaft from the driving shaft; and an arm secured to the driving shaft and connected to the means some distance from the pivot so that, on turning the driving shaft, said means will be moved on its pivot.

10. The combination in lever mechanism, of a power shaft; a lever pivoted at the same center as said shaft; a driven shaft carried by said lever; means carried by the lever for driving the driven shaft from the driving shaft; and an arm secured to the driving shaft so that motion will be imparted to said arm on turning the driving shaft.

In witness whereof I affix my signature.

LEONARD RODENHAUSEN.

Copies of this patent may be obtained for five cents each, by addressing the "Commissioner of Patents, Washington, D. C."